W. J. PATON.
FIRE EXTINGUISHING APPARATUS FOR SHIPS.
APPLICATION FILED DEC. 12, 1911.
1,034,291.
Patented July 30, 1912.
2 SHEETS—SHEET 1.
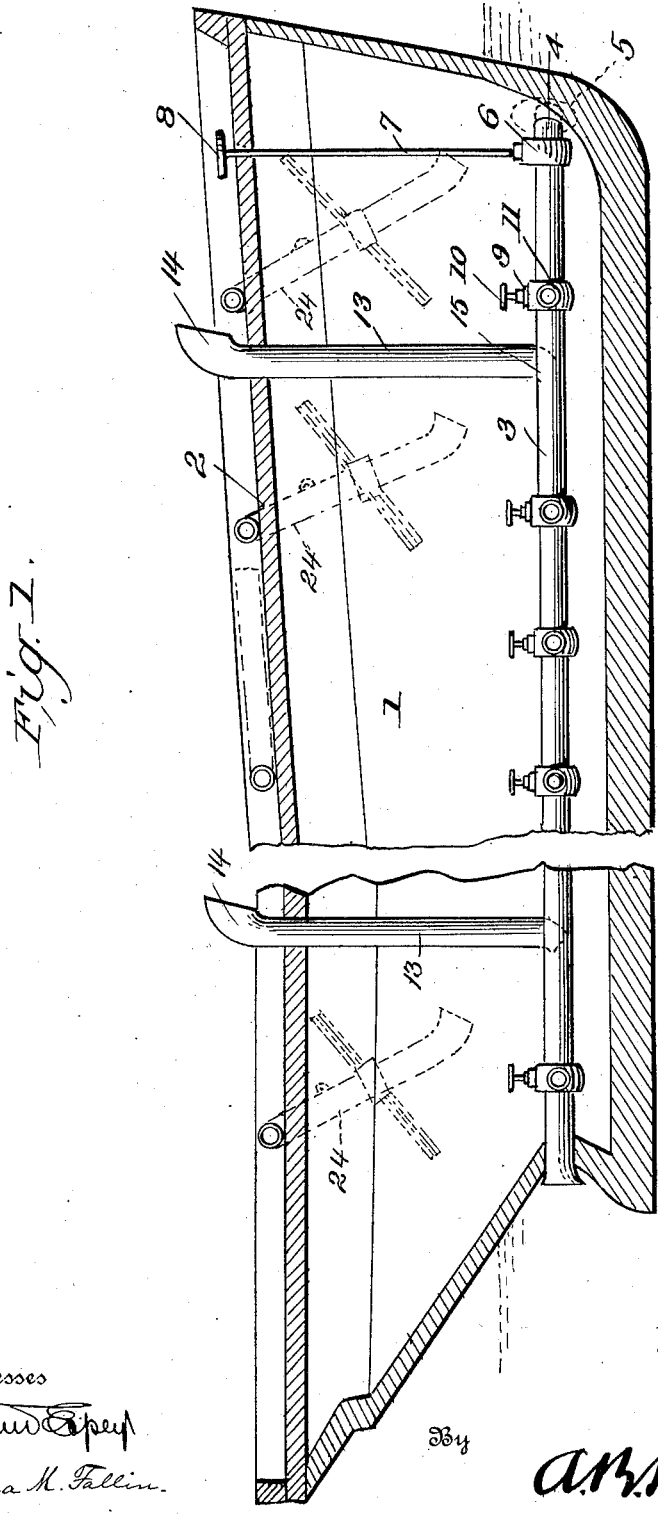
Witnesses
Inventor
W. J. Paton
By
A. B. Stacy, Attorney.

W. J. PATON.
FIRE EXTINGUISHING APPARATUS FOR SHIPS.
APPLICATION FILED DEC. 12, 1911.
1,034,291.
Patented July 30, 1912.
2 SHEETS—SHEET 2.
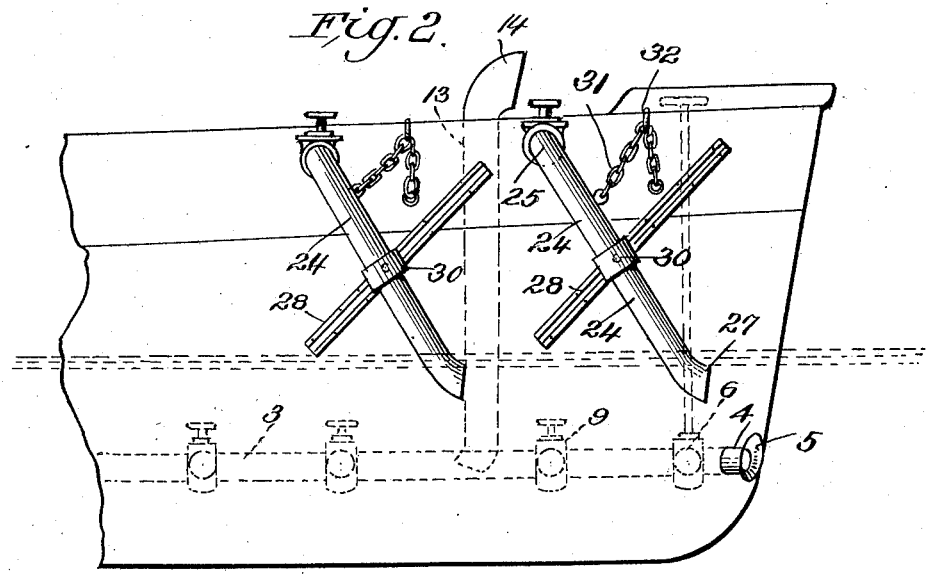
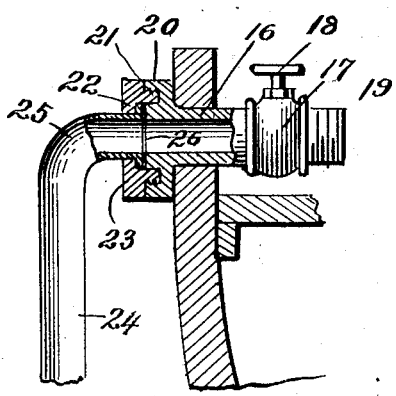
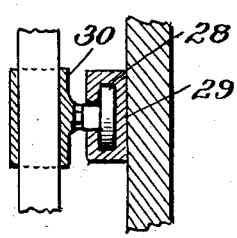
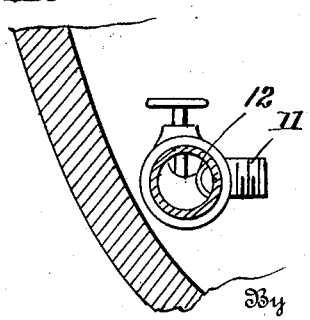
Inventor
W. J. Paton
Witnesses
By
A. R. Lacey, Attorney.

UNITED STATES PATENT OFFICE.

WALTER J. PATON, OF GALVA, KANSAS.

FIRE-EXTINGUISHING APPARATUS FOR SHIPS.

1,034,291.  Specification of Letters Patent. Patented July 30, 1912.

Application filed December 12, 1911. Serial No. 665,321.

*To all whom it may concern:*

Be it known that I, WALTER J. PATON, citizen of the United States, residing at Galva, in the county of McPherson and State of Kansas, have invented certain new and useful Improvements in Fire-Extinguishing Apparatus for Ships, of which the following is a specification.

This invention relates to water distributing and fire extinguishing apparatus for vessels, and aims to provide for the distribution of water to different parts of the vessel either for the purpose of washing the decks or for extinguishing fires, without the employment, however, of pumping apparatus, or mechanically operated water elevators.

The invention contemplates utilizing the head of water flowing through a pipe extending lengthwise of the hull of the vessel and having one end opening at the stern of the hull, for obtaining the necessary pressure to distribute this water as desired, and the invention further contemplates the provision of pipes arranged in a series along each side of the hull and adapted to be lowered into the water, for the purpose of securing a supply of water available for use in washing the decks.

For a full understanding of the invention reference is to be had to the following description and accompanying drawings, in which:—

Figure 1 is a vertical longitudinal sectional view through a ship's hull, showing the arrangement of the device embodying the present invention. Fig. 2 is a fragmentary side elevation of the stern end of the hull illustrating the manner of mounting the pipes which are designed to supply water to the deck. Fig. 3 is a vertical transverse sectional view through a portion of the hull, further illustrating the manner of mounting the said supply pipes. Fig. 4 is a detail sectional view on the line 4—4 of Fig. 2 illustrating the manner of supporting each of the pipes.

Corresponding and like parts are referred to in the following description and indicated in all the views of the accompanying drawings by the same reference characters.

In the drawings, the numeral 1 indicates in general the hull of a vessel equipped with the water distributing apparatus embodying the present invention, and 2 indicates the deck. Extending longitudinally within the hull 1 at each side thereof is a pipe 3, which at its forward end opens through the hull, as indicated at 4, and is flared as at 5. A cut-off valve 6 is arranged within each of these pipes 3 directly inwardly of the points of engagement of the pipes through the hull at the bow of the vessel, and these valves have relatively long vertically extending stems or rods 7 which project through the deck 2 and are provided at their upper ends with hand-wheels 8, whereby the valves may be opened and closed by a seaman standing on the deck. At intervals, depending upon the length of the hull and the arrangement of the various compartments thereof below decks, are valves 9 which are normally closed and which have their valve stems provided with hand-wheels 10 by which the valves may be rotated to open position, and from the casing of each valve there projects a nipple 11 to which may be attached a suitable hose. Each pipe 3 opens at its rear end through the hull of the vessel at the stern thereof. At this point it will be understood that when the vessel is under way and the valve 6 is opened, water will rush into the respective pipe 3 and may be drawn off through a suitable hose coupled to any of the valve nipples 11 by opening that particular valve. In this manner, should a fire break out in the hull, fire hose may be attached to any one or several of the valve nipples 11 and the proper valves opened to secure a steady and powerful head of water.

In order to insure of the water flowing through the pipe 3 being directed through the outlets of the valve casing 9, each valve casing is provided interiorly, at the inner end of its respective nipple 11, with a substantially funnel-shaped scoop 12 which serves to deflect a certain volume of water through the nipple and into the hose attached thereto.

In order to relieve the pipe 3 of accumulated air and stagnant water when the valve 6 is closed, air conducting flues 13 are arranged at intervals at each side of the hull and have open intake ends 14 presented in the direction of the bow of the boat and have their lower ends opening into the pipes 3 as indicated by the numeral 15 and presented in the direction of the discharge ends of the said pipes.

The portion of the apparatus above described is, as will be readily understood, especially designed to supply water below the decks and another portion of the apparatus to be now described, is arranged to supply water above decks.

Mounted at intervals through the bulwarks of the vessel are short pipes 16 in each of which is interposed a cut-off valve 17 having a hand-wheel 18 by means of which it may be opened or closed, and each pipe is threaded as at 19 for the attachment of a suitable hose. Each of the pipes 16 at its outer end, is formed with a circumscribing flange 20 threaded as at 21 to receive a flange 22 formed upon one face of a collar 23. A pipe 24 is provided at its upper end with an elbow 25 terminating in a flange 26 and the elbow of this pipe 24 is fitted through the collar 23 and the flange 26 is confined between the said collar and the end of the respective pipe 16. It will be readily understood that the pipes 24 are equal in number to the pipes 16 and it will be observed from the drawings that they are arranged to either extend downwardly as shown in Fig. 2 or to be swung up to position beside the bulwarks, as shown in dotted lines in Fig. 1. These pipes are of such length that when swung down, as shown in Fig. 2, their lower or intake ends 27 will project below the water line, so that as the vessel moves forwardly, water will be forced up through the pipes 24 and if the valves 17 be opened, will be forced out through hose attached to the nipples 19. As a means for supporting the pipes 24 at the desired adjustment and for bracing them against displacement with respect to the hull, a channel slide-way 28 is secured upon the outer side of the hull adjacent each pipe 24 and in inclined position, as shown in Fig. 2, and arranged for sliding movement in each of these ways 28 is a block 29 to which is swiveled a sleeve 30 slidably receiving the respective pipe 24.

Chains 31 are connected at their lower ends to the pipes 24 and have their links engaged interchangeably with hooks 32 upon the bulwarks of the hull. From the above it will be understood that the chains 31 serve to support the pipes 24 beside the bulwarks or in downwardly inclined position and that the sleeves 30, by reason of their connection to the blocks 29 which work in the slide-ways 28 serve to brace the pipes against displacement outwardly from the hull.

Having thus described my invention, what is claimed is:

1. In combination with a ship's hull, a discharge pipe mounted upon the wall of the hull and an intake pipe having swivel connection with the discharge pipe and adapted to be swung down to position its intake end below the water line of the hull.

2. In combination with a ship's hull, a discharge pipe mounted upon the wall of the hull, an intake pipe having swivel connection with the discharge pipe and arranged to be swung down to position its intake end below the water line of the hull, and means for supporting the intake pipe at different angles of inclination.

3. In combination with a ship's hull, a discharge pipe mounted upon the wall of the hull, an intake pipe having swivel connection with the discharge pipe and arranged for angular adjustment whereby to be positioned beside the hull or to extend with its intake end located below the water line of the hull, a slideway mounted upon the hull, a block movable in the slideway, a sleeve swiveled to the block and slidably receiving the intake pipe, and means for supporting the intake pipe at angular adjustment.

In testimony whereof I affix my signature in presence of two witnesses.

WALTER J. PATON. [L. S.]

Witnesses:
 WILFRED ANDERSEN,
 L. A. BRADBURY.

Copies of this patent may be obtained for five cents each, by addressing the "Commissioner of Patents, Washington, D. C."